United States Patent [19]
Jamison et al.

[11] Patent Number: 5,475,040
[45] Date of Patent: Dec. 12, 1995

[54] LOW VISCOSITY, THERMOPLASTIC MODIFIED, LOW CTE THERMOSETTING POLYESTER ENCAPSULANTS FOR MICROELECTRONICS

[75] Inventors: William L. Jamison, Fishers; William H. Jenson; George E. Sears, Jr., both of Indianapolis, all of Ind.

[73] Assignee: Thermoset Plastics, Inc., Indianapolis, Ind.

[21] Appl. No.: 259,340

[22] Filed: Jun. 14, 1994

Related U.S. Application Data

[63] Continuation of Ser. No. 947,737, Sep. 21, 1992, abandoned.

[51] Int. Cl.$^6$ .............................. C08K 3/00; C08L 67/00
[52] U.S. Cl. ........................ 523/513; 523/521; 524/430; 524/494; 525/27; 525/30; 525/49; 525/130; 525/131; 525/179; 525/181
[58] Field of Search ...................... 524/507, 513, 524/515, 430, 494; 525/27, 30, 49, 130, 131, 179, 181; 523/513, 521

[56] References Cited

U.S. PATENT DOCUMENTS

| | | | |
|---|---|---|---|
| 4,245,068 | 1/1981 | Brewbaker et al. | 525/447 |
| 4,298,711 | 11/1981 | Moulson et al. | 525/40 |
| 5,075,393 | 12/1991 | Thompson | 525/444 |

*Primary Examiner*—Paul R. Michl
*Assistant Examiner*—U. K. Rajguru
*Attorney, Agent, or Firm*—Barnes & Thornburg

[57] ABSTRACT

Filled, thermoplastic-modified thermosetting polyester resin formulations are provided as encapsulants for microelectronics devices. The polyester encapsulant formulations include either a low profile thermoplastic resin additive or a combination of polyethylene and a low shrink thermoplastic additive. In preferred embodiments the polyester encapsulant formulations are of low viscosity and can be utilized in various pressure molding protocols. The encapsulant matrix is characterized by a low coefficient of thermal expansion, very low shrinkage, low modulus, and good thermal conductivity. Microelectronics devices encapsulated with the polyester resin formulation exhibit good resistance to moisture related and stress-induced failure.

34 Claims, No Drawings

LOW VISCOSITY, THERMOPLASTIC MODIFIED, LOW CTE THERMOSETTING POLYESTER ENCAPSULANTS FOR MICROELECTRONICS

This is a continuation application of application Ser. No. 07/947,737 filed Sep. 21, 1992 now abandoned.

FIELD OF THE INVENTION

This invention relates to polyester formulations for encapsulating electronic devices by liquid transfer, injection or other forms of pressure molding. More particularly, this invention is directed to improved low viscosity polyester resin formulations which can be thermoset to a plastic matrix exhibiting an exceptionally low coefficient of thermal expansion (CTE), low modulus and high thermal conductivity. The present polyester resin formulations exhibit good physical and chemical stability, and they find economical, functionally advantageous application for encapsulating electronic devices and components, especially semiconductor devices, such as transistors, diodes, capacitors and multi-component integrated circuits.

BACKGROUND AND SUMMARY OF THE INVENTION

There has been a significant research and development effort directed toward defining improved methods and materials for commercial manufacture of microelectronics devices. Generally the most technically intensive aspects of the manufacturer of such devices are associated with the active electrical components themselves. But the inherently delicate nature of such devices and their susceptibility to moisture and other elements of their operating environment requires that the active components be encased with a protective inert material. Such encasing or encapsulating material must not only protect the device from mechanical shock loads incurred in handling but it must also provide an electrically nonconductive environment for the device protecting it from light and moisture. Moreover, the encapsulant material must serve as a thermally conductive medium so that heat generated during operation of the encapsulated device is readily dissipated to minimize thermal stress.

Generally, many polymeric resins have been used commercially for microelectronic device encapsulation. Filled epoxy resins have been used most extensively. They have been found to provide the requisite physical/chemical characteristics, and durability required by the electronics industry. Yet in spite of the popularity epoxy resins have enjoyed commercially as a microelectronics device encapsulating resin, epoxy resins prepared for such applications are expensive, and they require extended cure times and post-cure processing. The use of epoxy resin encapsulants suffers as well from the costs of the extra labor/equipment required for transfer molding processes. Moreover, although much effort has been directed to the formulation of epoxy resin encapsulants having low coefficients of thermal expansion and low shrinkage during resin cure, stress-induced failure of fragile microelectronics devices during the encapsulation process remains as a significant problem in commercial device manufacturing operations using epoxy resin encapsulants.

Some of the disadvantages of the use of epoxy resins for encapsulation of microelectronics devices can be overcome by the use of filled polyester resins that can be delivered to molds using conventional injection molding technology. Polyester resins are generally less expensive, and they have a relatively rapid cure rate (and require no post-cure processing). Notwithstanding those well-recognized characteristics, polyester resins have not been accepted by the electronics industry as a suitable substitute for the more expensive thermosetting epoxy resins.

Polyester resins are known to have a high degree of shrinkage, and when such is not controlled, the stress imposed on an encapsulated device by a shrinking resin encapsulant can result in high device failure rates. It is known in the art that the shrinkage of polyester resins during cure (polymerization) can be controlled by, for example the addition of solid fillers and/or certain thermoplastic resins. Yet even with such shrink control technology available, polyester resins still have found little or no commercial acceptance for microelectronics encapsulation applications.

One disadvantage that state-of-the-art low viscosity thermoplastic-resin-modified polyester formulations still suffer when compared to their filled epoxy resin counterparts is their coefficient of thermal expansion (CTE), a physical property that bears significantly on the performance of device encapsulants under conditions of thermal cycling inherent in many microelectronics applications. A low CTE more aligned with the CTE of the device components themselves minimizes cracking of the encapsulant where it interfaces conductor leads or integrally molded metallic lead frames. State-of-the-art low viscosity ($<8\times10^6$ centipoise) thermosetting polyester formulations containing shrink controlling amounts of thermoplastic resins cure to plastic matrices commonly exhibiting coefficients of thermal expansion of about $30\times10^{-6}$ cm/cm/°C. or higher, often more than $50\times10^{-6}$ cm/cm/°C. Some of the low-stress-formulated epoxy resin encapsulants on the other hand are reported to exhibit coefficients of thermal expansion of less than $30\times 10^{-6}$ cm/cm/°C.

One other disadvantage noted in the art for use of polyester resins as encapsulants for microelectronics devices is that devices encapsulated with state-of-the-art polyester formulations generally exhibit more susceptibility to moisture related failure; an incomplete seal forms between the outer surface, e.g., of the leads, and the encapsulating resin. There has been some effort to address that problem—see Kaplan U.S. Pat. No. 4,327,369. But again, such efforts have failed to produce polyester resin formulations which meet the demanding standards of the microelectronics manufacturing industry. Thus, there is still a need for development of improved polyester resin formulations which can be used as economical substitutes for epoxy resins in commercial microelectronics device encapsulation applications.

Thus it is one object of this invention to provide an injection moldable polyester resin formulation which cures at low mold pressures to a plastic matrix having a low coefficient of thermal expansion.

It is another object of this invention to provide a phase stable, low viscosity, filled polyester resin formulation containing a low profile thermoplastic resin and thermally curable to a plastic matrix having good thermal conductivity and a coefficient of thermal expansion of less than $30\times10^{-6}$ cm/cm/°C.

Another object of this invention is to provide a filled polyester resin formulation substantially free of mold release agents which when used as an encapsulant for electronics devices exhibits commercially acceptable mold release characteristics and provides polyester resin encapsulated devices exhibiting enhanced resistance to moisture related failure.

It is still a further object of this invention to provide a filled, phase stable, thermoplastic-resin-modified polyester resin formulation that has a molding viscosity which allows use of the resin formulation in conventional pressure molding apparatus.

Still another object of this invention is to provide a low viscosity thermosetable polyester resin formulation containing a combination of polyethylene and a low shrink thermoplastic resin and thermally curable to a plastic matrix having coefficient of thermal expansion of a value less than $30\times10^{-6}$ cm/cm/°C.

In yet another object of this invention there is provided an improved process for preparing plastic encapsulated microelectronics devices with significant reduction in stress-induced device failures by using an economical, low viscosity, filled polyester resin formulation containing a low profile thermoplastic resin additive or a combination of polyethylene and a low shrink resin additive in an amount effective to provide a resin composition which can be thermoset to a plastic matrix having good thermal conductivity and a coefficient of thermal expansion of about $10\times10^{-6}$ to about $30\times10^{-6}$ cm/cm/°C.

In still another embodiment of this invention there is provided a microelectronic device encapsulated in a polyester matrix substantially free of conventional mold release agents and having a coefficient of thermal expansion less than $30\times10^{-6}$ cm/cm/°C.

Those and other related objects which will be apparent to those of ordinary skill in the art are accomplished in accordance with this invention by preparation and use of a novel thermosetting polyester resin formulation comprising an unsaturated polyester, a low profile thermoplastic resin or a combination of polyethylene and a low shrink thermoplastic resin, an unsaturated monomer capable of cross linking the unsaturated polyester, an inert filler and a free radical initiating agent in an amount effective to polymerize the resin composition to provide a filled plastic matrix having a coefficient of thermal expansion less than $30\times10^{-6}$ cm/cm/°C. In preferred embodiments, the present resin composition is further characterized by low viscosity, less than $8\times10^{-6}$ centipoise at normal ambient temperature, allowing it to be handled/molded in conventional pressure molding protocols. The low injection pressure allowed by the low viscosity of the present formulations not only reduces mold maintenance but also allows molding of devices having delicate, fine wires exposed, as is typical on many semi-conductor devices, without damage to the device.

The polyester resin formulations of this invention provide cost savings for electronic device encapsulation applications not only through their utilization of cost efficient polyester resins, but also by virtue of the reduced labor cost associated with pressure molding operations, and more significantly, the occurrence of fewer stress-induced device failures. The high thermal conductivity and the low coefficient thermal expansion of the cured encapsulant matrix achieved by molding the present low viscosity, filled, polyester resin formulations modified with low profile thermoplastic resin additives or a combination of polyethylene and a low shrink additive, find no antecedent in the art relating to injection moldable polyester formulations. While filled polyesters curable to plastic matrices having comparable coefficients of thermal expansion have been reported in the art, such are reported for the glass fiber-filled polyester molding formulations which have viscosities which would not allow use of those formulations for microelectronics device encapsulation applications using the low pressure molding protocol specified for use of the preferred low viscosity formulations of the present invention. The combination of properties exhibited by the improved polyester resin formulations of this invention makes them uniquely adapted for microelectronics device encapsulation. The present resin formulations have low molding viscosity (and concomitantly low molding pressures), and good phase stability. The cured resins exhibit low coefficient of thermal expansion, low modulus, favorable mold release characteristics without added mold release agents, and good moisture resistance of the encapsulated devices, all utilizing low cost (vs. epoxy resins) polyester resin components.

DETAILED DESCRIPTION OF THE INVENTION

In accordance with the present invention there is provided a thermosetting, filled polyester resin formulation particularly adapted for use as an encapsulant for microelectronics devices. The polyester formulation, in preferred embodiments, is a self-leveling, liquid composition that can be utilized in conventional low pressure liquid transfer molding/injection molding protocols. The formulations are characterized by their use of selected thermoplastic resins or combinations of thermoplastic resins, which cooperate with other formulation components on curing to provide a plastic encapsulant matrix with ideal properties for microelectronics encapsulation. The encapsulant matrices formed by thermally induced polymerization of the present polyester formulation exhibits excellent thermal conductivity, very low shrinkage, a low coefficient of thermal expansion, low internal stress, and excellent mold release characteristics without need for added mold release agents. Microelectronic devices encapsulated with the present formulation exhibit good moisture resistance, particularly when the encapsulant formulations are substantially free of conventional mold release agents.

The functional characteristics of the present thermosetting polyester resin formulations, including their low viscosity, low cure temperature (and low cure exotherm) allow for use in improved processes for encapsulating semi-conductor devices. Using the present polyester formulations semiconductors and other microelectronics devices can be encapsulated more cost-efficiently (vs. use of epoxy encapsulants) with improvement of device performance. Device encapsulation is much more efficient in that there are few, if any, device failures attributable to internal stress of the cured encapsulant polyester matrix.

Generally the polyester resin formulations of this invention comprise a resin composition, itself comprising an unsaturated polyester and either a low profile thermoplastic resin or a combination of polyethylene and a low shrink thermoplastic resin, further in combination with an unsaturated monomer capable of cross-linking the unsaturated polyester. The present resin formulations also include about 40 to about 80 weight percent of an inert filler and a free radical initiating agent in an amount effective to polymerize the resin composition.

The resin composition comprises about 20 to about 60 weight percent, more preferably about 25 to about 40 weight percent of the thermosetting polyester resin formulation. The resin composition itself comprises about 30 to about 60 weight percent, more preferably about 35 to about 55 weight percent of an unsaturated polyester, about 15 to about 35 weight percent, more preferably about 20 to about 30 weight percent, of a low profile thermoplastic resin, or a combination of polyethylene and a low shrink thermoplastic resin, and about 10 to about 40 weight percent, more preferably about 15 to about 25 weight percent of an unsaturated monomer capable of cross-linking the unsaturated polyester.

The unsaturated polyester can be selected from any of a wide variety of commercially available polyesters, preferably those prepared from maleic or fumaric acid and dihydric alcohols such as ethylene glycol, propylene glycol, butylene glycol, diethylene glycol, dipropylene glycol, or triethylene glycol. Commercially available vinyl esters or thermosetting hydrocarbon resins such as polybutadiene homopolymers or butadiene-styrene copolymers can be substituted for at least a portion of the unsaturated polyester component to fine-tune the molding/encapsulant matrix characteristics to meet the requirements of selected encapsulant applications.

The resin composition component of the present encapsulant formulations comprise about 15 to about 35 weight percent of a low profile thermoplastic resin or a combination of polyethylene and a low shrink thermoplastic resin, preferably polystyrene. It is well-known in the art that unsaturated polyester resins shrink as much as 5 to 9 percent depending upon the nature of the unsaturated polyester itself and the concentration of the monomer. It is well recognized in the art that the use of high levels of inert fillers minimizes shrinkage during resin cure. It is also known that thermoplastic resins can be added to unsaturated polyester resin formulations to control shrinkage. Thermoplastic resin additives for controlling shrinkage of polyester resin formulations are typically categorized as "shrink control" additives, "low shrink" additives, or "low profile" additives, depending on their capacity to reduce shrinkage during cure of polyester resins. Those thermoplastic additives which are effective to reduce shrinkage generally up to about 50 percent are designated in the art as "shrink control" or "shrink reducer" additives. Polyethylene powder falls in that category. So-called "low shrink additives" when used at effective levels can reduce shrinkage from more than 50 to about 90 percent. Polystyrene is perhaps the most widely used low shrink additive. Thermoplastic resins categorized as low profile additives can be used at effective levels, typically less than 40 percent by weight of the resin composition, to reduce shrinkage greater than 90 percent. Some low profile additives can be used at levels in unsaturated polyester formulations which upon polymerization actually results in a polymerized plastic matrix having a volume slightly greater than that of the pre-polymerized resin formulation. The present resin compositions are formulated with the purpose of achieving a shrinkage on cure of about 0 to 0.3%, more preferably about 0 to less than 0.1%. Some minimal shrinkage is desirable in that such performs an intrinsic mold release function and allows the formulations to be prepared without conventional mold release additives, the presence of which have been shown experimentally to contribute to moisture-related device failure. The low profile additives can be used alone or advantageously in combination with other thermoplastic additives including low shrink, shrink control, and other low profile additives.

There are a wide variety of commercially available low profile thermoplastic resins which can be utilized in the present encapsulant formulations. Preferred low profile thermoplastics include saturated polyesters, polyurethanes, urethane/polyester co-polymers and elastomers such as styrene butadiene rubber. It is important that the thermoplastic resin component be soluble in the resin composition prior to polymerization. Also, the use of the present resin formulations as microelectronics encapsulants dictates that the thermoplastic additives have a low acid number. Preferably the thermoplastic resin component should have an acid number less than 15, more preferably less than 10.

Exemplary of commercially available low profile thermoplastic resins for use in the present resin formulations are the Uralloy® hybrid polymer LP85-05, a low profile modified polyurethane sold by Olin Chemicals, Stamford, Conn., and the Leguval® brand thermoplastic resins, including Leguval KU3-7248, Leguval KU3-7232B, and Leguval KU3-7258, all sold by DSM Resins of Zwolle, The Netherlands.

In one embodiment of this invention, the thermoplastic additive in the resin composition component of the present polyester encapsulant formulations comprises a combination of a polyethylene powder and a low shrink thermoplastic resin additive. One preferred low shrink additive is polystyrene. When polystyrene and polyethylene powder are used in combination, they can be used in a ratio of about 20:1 to about 2:1.

The resin composition component of the thermosetting polyester resin formulations of this invention also comprise about 10 to about 40 weight percent of an unsaturated monomer capable of cross-linking the unsaturated polyester. The most common and preferred cross-linking monomer is styrene; however, vinyl toluene, alphamethylstyrene, and diallyphthalate can also be used.

The inert filler component of the compositions of the present invention can be selected from those commercially available mineral fillers that have been used in the art to enhance thermal conductivity. They can be selected from a wide variety of thermally conductive particulate, preferably microparticulate, mineral compositions including alumina, alumina trihydrate, silica, particularly fused silica, glass, calcium carbonate or other art-recognized mineral fillers. Preferably the mineral filler is substantially free of mineral fillers having an aspect ratio of 3:1 or more, including particularly mineral fibers. Thus preferred inert fillers comprise low aspect ratio mineral particulates having an average particle size of less than 20 microns, more preferably less than 15 microns, and most preferably the inert fillers should comprise low aspect ratio (<3:1) mineral particulates having an average particle size of less than 10 microns in its largest dimension. Preferred fillers include fused silica, alumina and alumina trihydrate, alone or most preferably in combination.

The rheological properties of the resin formulation of the present invention can be controlled or adjusted by the addition of organic fillers including particularly thermoplastic fibers dispersible in but not soluble in the resin composition. Such organic filler components can be included in addition to or substituted for at least a portion of one or more of the mineral filler components. Examples of such organic fiber fillers include an aramid pulp sold by DuPont under the trade name Kevlar® and polyethylene pulp sold by DuPont under the trade name PulPlus™.

The thermosetting unsaturated polyester resin formulations of the present invention also comprise a free radical initiating agent in an amount effective to polymerize the resin composition after it is injected into a mold heated typically to a temperature of about 130° to about 200° C. The free radical initiators are typically resin miscible organic peroxides which are stable at ambient temperature, but decompose at elevated temperatures to propagate free radical polymerization and concomitant cure of the resin formulation. Many organic peroxides detailed for use as free radical initiators are commercially available. Examples of such include dicumylperoxide, di-t-butylperoxide, t-butylperbenzoate, t-butylperoxy-2-ethylhexocarbonate, t-butylperoctoate, 2,5 dimethyl-2-5-di(2-ethylhexanoylperoxy)hexane, t-amylperbenzoate and t-amylperoctoate. Typically the free radical initiating agent is used at less than 1 percent by weight of the resin composition, more preferably less than 0.5 weight percent.

The thermosetting resin formulations of this invention can include other additives including pigments, inhibitors, phase compatibilizers/stabilizers and coupling agents, to complement the physical and chemical properties of the formulations. Thus, for example, one or more commercially available coupling agents can be employed to facilitate blending of the filler components with the resin composition. Coupling agents, for example, organofunctional silane coupling agents sold by Union Carbide, can be employed, often in trace amounts but generally from about 0.1 to about 0.5 weight percent based on the weight of the resin composition to facilitate blending of the resin formulation. Polymerization inhibitors, which function to prevent premature polymerization of the resin formulation, can be utilized at trace levels, generally less than 0.1 weight percent based on the resin formulation. Such inhibitors work not only to enhance shelf life but also premature propagation of the resin polymerization, e.g., in the mold "runners", during the injection molding process. Exemplary of such inhibitors are hydroquinone, p-benzoquinone, p-methoxyphenol, and 2,6-di-t-butylphenol.

As mentioned above in the discussion of thermoplastic additives for the present formulations, it is important, if not critical to the function of such additives, that they remain miscible with the polyester/monomer components of the resin composition (at least until the beginning of the curing process). Most art-recognized polyester formulations utilizing thermoplastic additives for shrink control are sheet molding compounds or bull molding compounds which are highly filled (fiber-filled), compositions in which phase separation is not a problem principally because of their very high viscosity. In the low viscosity ($<8\times10^6$ centipoise) compositions of the present invention, the inherent incompatibility of the polyester and many of the available thermoplastic additives, especially the low profile additives, can result more easily in premature phase separation. It has been found that phase separation can be inhibited by the addition of trace amounts, generally less than 1.0 weight percent of the resin composition, of a polymeric anionic or cationic compatibilizer sold by BYK Chemie under the trade name BYK®. One preferred anionic compatibilizer is a saturated polyester with acid groups sold as BYK®-W995. When such compatibilizers are utilized they are blended into the resin composition before addition of the filler components.

The unsaturated polyester resin formulations of the present inventions can be prepared using conventional resin/ paste mixing/blending equipment. The compositions are optionally prepared utilizing a conventional three-roll mill. Typically the resin components, including the thermoplastic resin, polymerization inhibitor and coupling agent and/or compatibilizer, are first blended and the resulting resin composition blend is combined and blended sequentially with portions of the filler components until all of the filler has been blended into the composition.

The viscosity of the polyester resin formulations in accordance with this invention will depend significantly on the level of filling and the viscosity of the polyester and thermoplastic resin components. Generally the molding viscosity of the polyester resin formulations is less than $8\times10^6$ centipoise at ambient temperature, more preferably at less than $5\times10^6$ centipoise. Most preferably the resin formulations of this invention are self-leveling compositions having a viscosity between about $5\times10^5$ and about $2\times10^6$ centipoise at ambient temperature. At such viscosities, the resin formulation can be utilized in standard liquid transfer injection molding protocols wherein the resin is injected at relatively low pressure (500–2000 psi) into a mold heated to a temperature of about 130° C. to about 200° C.

The resin formulations of this invention are uniquely adapted for encapsulation of microelectronics devices using art-recognized injection molding procedures and apparatus, for example, that described in U.S. Pat. No. 3,608,150. Thus, improved plastic encapsulated microelectronics devices having electrically connected conductors extending through the plastic encapsulant are prepared in accordance with one embodiment of this invention by disposing the device and at least a portion of the conductor in a heated mold and injecting a low viscosity, filled, polyester formulation of this invention. Use of the present polyester formulations for encapsulating microelectronics devices provides a higher percentage of functional devices than does encapsulation with state-of-the-art shrink-modified epoxy encapsulants. It is believed that the low rate of device failure derives from inherently lower internal stresses resultant from polymerization (curing) process itself; the formulations are polymerized at relatively low pressures, and at low temperature (due to relatively low cure exotherm). Moreover, the plastic matrices formed polymerization of the present polyester resin formulations exhibit high thermal conductivity and an exceptionally low coefficient of thermal expansion relative to other non-mineral-fiber-filled polyester resin products. Typically the polyester matrices in accordance with this invention exhibit a coefficient of thermal expansion less than $30\times10^{-6}$ cm/cm/°C., more typically less than $25\times10^{-6}$ cm/cm/°C. Preferred encapsulant formulations of this invention can be thermoset to a plastic matrix exhibiting a coefficient of thermal expansion between about $10\times10^{-6}$ and about $20\times10^{-6}$ cm/cm/°C. The low coefficient of thermal expansion predicts fewer device failures during thermal cycling common to use of most microelectronics devices. The present polyester formulations, when used as device encapsulants, provide devices that exhibit good resistance to moisture-related device failure without the use of the organo-metal silanes described in Kaplan U.S. Pat. No. 4,327,369.

Table 1 illustrates the composition of polyester liquid transfer molding formulations in accordance with the present invention. The following is a description of the procedure of preparing the Formulations A and B with reference to the numbered ingredients listed in Table 1.

TABLE 1

Polyester Encapsulant Formulations

| | Formulation | | | |
|---|---|---|---|---|
| | A | B | C | D |
| (1) Polyester | | | | |
| Poly(propylene maleate): 65% Solids in styrene monomer [Cargill 8902] Thermoplastic Resin | 65.0ª | 68.0 | 65.0 | 50 |
| (2) Polystyrene: 30% in styrene monomer [Owens Corning P-713] | 33.0 | | 33.0 | |
| (3) Polyethylene Powder [FA-750] | 5.0 | | 5.0 | |
| (4) Polyester urethane: | | 32.0 | | |

TABLE 1-continued

Polyester Encapsulant Formulations

| | Formulation | | | |
|---|---|---|---|---|
| | A | B | C | D |
| 70% in styrene monomer [Leguval KU-7232B] | | | | |
| Styrene-butadiene rubber: | | | 50 | |
| 30% in styrene monomer [Kraton-G-1855] | | | | |
| (5) Styrene Monomer: | | 4.50 | | |
| Pigments: | | | | |
| (6) Carbon Black* | 2.0 | | 2.0 | |
| (7) Black Pigment Paste [PDI-1803] | | 8.00 | | 8.00 |
| Lubricants: | | | | |
| (8) Ethylene Bisstearamide Wax | 0.50 | | | |
| (9) Zinc Stearate | 1.00 | | | |
| Inhibitors: | | | | |
| (10) Hydroquinone Solution** | 0.50 | 0.50 | 0.50 | 0.50 |
| (11) p-Benzoquinone Solution*** | 0.25 | 0.25 | 0.25 | 0.25 |
| Organofunctional Silane: gamma-methacryloxypropyltrimethoxysilane (12) [Union Carbide A-174] | 1.00 | 1.00 | 1.00 | 1.00 |
| Compatibilizers: BYK W-995 | | | | .5 |
| Fillers: | | | | |
| (13) Alumina [Hydral 710] | 60.0 | 60.0 | 60.0 | 60.0 |
| (14) Alumina Trihydrate [SB-336] | 90.0 | 90.0 | 90.0 | 90.0 |
| (15) Fused Silica [GP111] | 160.0 | 160.0 | 160.0 | 160.0 |
| Thermoplastic fiber [Kevlar ®-DuPont] | | | | 1.0 |
| (16) Peroxide Catalyst (Lupersol 331-80B) | 0.975 | 0.975 | 0.975 | 0.975 |

ª(Parts by weight)
*The 2.0 parts of carbon black are three-roll-milled into 8 parts of Owens Corning P713 to improve color uniformity of molded parts.
**Solution: 0.022 parts hydroquinone, 0.248 parts styrene and 0.23 parts glycol ether EE.
***Solution: 0.022 parts p-benzoquinone: 0.248 parts styrene and 0.23 parts glycol ether EE.

FORMULATION A—PROCEDURE:

1. Charge components 1 and 2 into mix tank of a Myers tri-shaft mixer and agitate for 5 minutes.

2. Under agitation, add components 6, 10, 11, 12 and 16. Continue mixing for 5–10 minutes after the last component is added.

3. Under agitation, add components 3, 8 and 9. Continue mixing until these components are completely dispersed and wetted.

4. Add slowly under agitation components 13, 14 and 15. Adjust agitator and auger speeds to obtain optimum mixing action. Continue mixing for 40–60 minutes after the addition of component 15.

5. Adjust cooling so that batch does not exceed 110° F. at any time during mixing operation.

6. Fill appropriate shipping containers with the blended polyester liquid transfer molding formulation.

FORMULATION B—PROCEDURE:

1. Charge components 1, 4 and 5 into mix tank.

2. Secure mix tank cover and commence agitation. Mix for 5 minutes.

3. Under agitation add components 7, 10, 11, 12 and 16. Continue mixing for 5–10 minutes after the last component has been added.

4. Add slowly, under agitation, components 13, 14 and 15. Adjust agitator and auger speeds to obtain optimum mixing action. Continue mixing for 40–60 minutes after the addition of component 15.

5. Caution: Adjust cooling so that batch does not exceed 110° F. at any time during mixing operation.

6. Fill appropriate shipping containers.

The typical molding parameters for Formulation A is shown in Table 2. Physical characteristics of the plastic matrices prepared by thermosetting Formulation A are shown in Table 3. The coefficient of thermal expansion for Formulation B cured plastic matrix was determined to be 14.6 PPM/°C.

TABLE 2

Formulation A - Molding Parameters

| | |
|---|---|
| Molding Pressure | 500–2000 psi |
| Molding Temperature | 145°–185° C. |
| Cure Time | 20–90 seconds |
| Viscosity (5 RPM @ 25° C.) | 800,000 cps |

TABLE 3

Formulation A - Cured Matrix Properties

| | |
|---|---|
| Color | Black |
| Hardness | |
| @ 25° C. | D-92 to D-97 |
| @ 165° C. | D-80 to D-85 |
| STM 5 ERF 9-82 (ASTM d 2240) | |
| Specific Gravity Calculated | 1.73 |
| Tensile Strength ERF 6-82 (ASTM D 638) | 4,900 psi |
| Flexural Strength ERF 5-82 (ASTM D 790) | 8,000 psi |
| Izod Impact (Notched) ERF 33-82 (ASTM D 256) | 0.25 ft lbs/in |
| UL Flammability (3.30 mm thickness) As tested by Thermoset | 94V-O |
| Thermal Conductivity ERF 22-69 | $25 \times 10^{-4}$ (cal × cm)/ (sec × cm$^2$ × °C.) |
| Water Absorption (24 hrs. @ 23° C.) ERF 28-82 (ASTM D 570) | 0.11% |
| Flexural Modulus | 1.7 e + 6 psi |
| Linear CTE (25° C.–190° C.) | 17.0 PPM/C |
| Glass Transition Temp. (Tg) | 231° C. |
| Steam Aging Stability (Tg, CTE) | Stable |
| Dielectric Constant | 4.0 @ 1 MHz |
| Extractable Cl - Ions | <10 PPM |
| Volume Resistivity @ 25° C. (ohm-cm) ERF 34-82 (ASTM D) | $2 \times 10^{16}$ |
| Surface Resistivity @ 25° C. (ohm-cm) ERF 34-82 (ASTM D 257) | $5 \times 10^{15}$ |
| Dielectric Strength (1/16) (ASTM D 149) | 480 volts/mil |

We claim:

1. A thermosetting polyester resin formulation having molding properties suitable for use in manufacture of microelectronic devices with a low stress induced device failure rate said formulation comprising (a) about 20 to about 60 weight percent of a resin composition comprising (a-1) about 30 to about 60 weight percent of unsaturated polyester, (a-2) about 15 to about 35 weight percent of a low profile thermoplastic resin, or, in combination, polyethylene and a low shrink thermoplastic resin and (a-3) about 10 to about 40 weight percent of unsaturated monomer capable of cross linking the unsaturated polyester, (b) about 40 to about 80 weight percent of inert filler substantially free of mineral fibers, and (c) a free-radical initiating agent in a amount effective to polymerize the resin composition, said formulation having a molding viscosity of less than $8 \times 10^6$ centipoise and at ambient temperature and capable of thermosetting to a plastic matrix with a coefficient of thermal expansion of less than $30 \times 10^{-6}$ cm/cm/C.

2. The polyester resin formulation of claim 1 wherein the inert filler comprises low aspect ratio mineral particulates having an average particle size of less than 15 microns.

3. The resin formulation of claim 2 wherein the inert filler is substantially free of mineral fillers having an aspect ratio of 3:1 or more.

4. The resin formulation of claim 1 having a molding viscosity of less than $8 \times 10^6$ centipoise at ambient temperature and capable of thermosetting to a plastic matrix having a coefficient of thermal expansion of less than $25 \times 10^{-6}$ cm/cm/°C.

5. The resin formulation of claim 1 substantially free of mold release agents.

6. The resin formulation of claim 1 wherein the thermoplastic resin is a low profile thermoplastic resin.

7. The resin formulation of claim 4 wherein the thermoplastic resin is a low profile thermoplastic resin.

8. The resin formulation of claim 7 having a molding viscosity of less than $3 \times 10^6$ centipoise and said formulation capable of thermosetting to a plastic matrix with a coefficient of thermal expansion of about $10 \times 10^{-6}$ to about $20 \times 10^{-6}$ cm/cm/°C.

9. The resin formulation of claim 7 wherein the thermoplastic resin has an acid number of less than 15.

10. The resin formulation of claim 1 wherein the thermoplastic resin comprises polyethylene and polystyrene.

11. The resin formulation of claim 2 wherein the inert filler further comprises thermoplastic fibers dispersible in but not soluble in the resin composition.

12. The resin formulation of claim 1 wherein the thermoplastic resin comprises a saturated polyester, a polyurethane, a urethane-polyester copolymer or a styrene butadiene rubber.

13. The resin formulation of claim 8 which is substantially free of conventional mold release agents, wherein the thermoplastic resin comprises a low profile thermoplastic resin, and wherein the inert filler comprises fused silica and alumina trihydrate.

14. A thermosetting injection moldable polyester resin formulation adapted for encapsulation of electronics devices with a low stress induced device failure rate, said formulation comprising about 25 to about 50 weight percent of a resin composition comprising about 35 to about 60 weight percent of unsaturated polyester, about 20 to about 30 weight percent of thermoplastic resin having an acid number less than 15, and about 10 to about 40 weight percent of unsaturated monomer capable of cross-linking the unsaturated polyester, about 50 to about 75 weight percent of an inert filler substantially free of mineral fibers and comprising low aspect ratio particulate mineral filler having an average particle size of less than 15 microns, and an organic peroxide curing agent in an amount effective to polymerize the resin composition, said resin formulation having a molding viscosity of less than $5 \times 10^6$ centipoise at ambient temperature and said formulation being capable of thermosetting to a plastic matrix having a coefficient of thermal expansion of less than $30 \times 10^{-6}$ cm/cm/°C.

15. The resin formulation of claim 14 wherein the thermoplastic resin comprises a low profile thermoplastic resin.

16. The resin formulation of claim 15 wherein the thermoplastic resin comprises polystyrene and polyethylene powder in a weight ratio of about 20:1 to about 2:1.

17. The resin formulation of claim 15 wherein the thermoplastic resin has an acid number less than 10.

18. The resin formulation of claim 16 where the inert filler consists essentially of fused silica and alumina trihydrate.

19. The resin formulation of claim 16 wherein the thermoplastic resin is selected from the group consisting of saturated polyesters, polyurethanes, urethane/polyester copolymers and styrenebutadiene rubbers.

20. The resin formulation of claim 16 wherein the inert filler consists essentially of fused silica and alumina trihydrate.

21. The resin formulation of claim 14 having a molding viscosity of less than $3 \times 10^6$ centipoise at ambient temperature and said formulation being capable of thermosetting to a plastic matrix with a coefficient of thermal expansion of less than $25 \times 10^{-6}$ cm/cm/°C.

22. The composition of claim 15 substantially free of mold release agents.

23. A method for reducing the stress-induced failures of electronic devices encapsulated in a plastic matrix formed by thermosetting a resin formulation comprising a resin composition, a mineral filler, and a catalyst in amount effective to polymerize said resin formulation under thermosetting conditions for said resin composition, said method comprising the steps of forming the plastic matrix by injection molding and thermosetting a polyester resin formulation comprising about 20 to about 60 weight percent of a resin composition comprising about 30 to about 60 weight percent of unsaturated polyester, about 15 to about 35 weight percent of a low profile thermoplastic resin having an acid number less than 15, or in combination polyethylene and a low shrink thermoplastic resin, and about 10 to about 40 weight percent of unsaturated monomer capable of cross-linking the unsaturated polyester, about 40 to about 80 weight percent of an inert filler having an average particle size of less than 20 microns and substantially free of mineral fiber, said polyester resin formulation having a molding viscosity of less than $8 \times 10^6$ centipoise at ambient temperature.

24. The method of claim 23 wherein the low shrink thermoplastic resin comprises polystyrene.

25. The method of claim 24 wherein the resin formulation is substantially free of mold release agents.

26. The method of claim 23 wherein the thermoplastic resin is a low profile thermoplastic resin.

27. The method of claim 26 wherein the resin formulation is substantially free of mold release agents and trialkoxyorgano-metal silane compounds.

28. A thermosetting polyester resin formulation comprising about 20 to about 60 weight percent of a resin composition comprising about 30 to about 60 weight percent of unsaturated polyester, about 15 to about 35 weight percent of thermoplastic resin, and about 10 to about 40 weight percent of unsaturated monomer capable of cross-linking the unsaturated polyester, about 40 to about 80 weight percent of inert filler substantially free of mineral fibers and consisting essentially of mineral particulates having an aspect ratio of less than 3:1 and an average particle size of less than 20 microns in their largest dimension and a free radical initiating agent in an amount effective to polymerize the resin composition at elevated temperature, said formulation having a molding viscosity of less than $8 \times 10^6$ centipoise at ambient temperature and capable of thermosetting to a plastic matrix having a coefficient of thermal expansion of less than $30 \times 10^{-6}$ cm/cm/°C.

29. The composition of claim 28 wherein the polyester resin formulation further comprises an effective amount of a coupling agent and has a molding viscosity of less than $5 \times 10^6$ centipoise.

30. The composition of claim 28 wherein the polyester formulation is capable of being thermoset to a plastic matrix having a coefficient of thermal expansion of less than $25 \times 10^{-6}$ cm/cm/°C.

31. The composition of claim 28 wherein the thermoplastic resin is a low profile thermoplastic resin.

32. The composition of claim 28 wherein the polyester resin formulation is substantially free of trialkoxyorganometal silane compounds.

33. The composition of claim 28 wherein the polyester resin formulation is substantially free of mold release agents.

34. The composition of claim 28 wherein the inert filler comprises alumina trihydrate and fused silica.

* * * * *